(12) United States Patent
Rosvall et al.

(10) Patent No.: US 8,764,963 B2
(45) Date of Patent: Jul. 1, 2014

(54) ELECTRODE

(75) Inventors: Magnus Rosvall, Göteborg (SE); Rolf Edvinsson-Albers, Partille (SE); Kristoffer Hedenstedt, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 198 days.

(21) Appl. No.: 12/743,100

(22) PCT Filed: Nov. 14, 2008

(86) PCT No.: PCT/EP2008/065515
§ 371 (c)(1),
(2), (4) Date: May 14, 2010

(87) PCT Pub. No.: WO2009/063031
PCT Pub. Date: May 22, 2009

(65) Prior Publication Data
US 2010/0236937 A1    Sep. 23, 2010

Related U.S. Application Data

(60) Provisional application No. 60/988,527, filed on Nov. 16, 2007.

(30) Foreign Application Priority Data

Nov. 16, 2007 (EP) .................................... 07120923

(51) Int. Cl.
*C25B 1/26* (2006.01)
(52) U.S. Cl.
USPC ............................ 205/504; 205/502; 205/503
(58) Field of Classification Search
USPC ......................................... 205/502, 503, 504
See application file for complete search history.

(56) References Cited

U.S. PATENT DOCUMENTS 3,518,173 A * 6/1970 Du Vernet ...................... 205/347
3,649,485 A * 3/1972 Chisholm ...................... 205/504
(Continued)

FOREIGN PATENT DOCUMENTS

CA    2 492 128 A1    7/2006
DE    195 06 857 A1    8/1996
(Continued)

OTHER PUBLICATIONS

Panic et al., "The Properties of Electroactive Ruthenium Oxide Coatings Supported by Titanium-Based Ternary Carbides", Surface & Coatings Technology (no month, 2007), vol. 202, pp. 319-324.*

(Continued)

*Primary Examiner* — Edna Wong
(74) *Attorney, Agent, or Firm* — Robert C. Morriss (57) ABSTRACT

A process for producing alkali metal chlorate that includes introducing an electrolyte solution containing alkali metal halide and alkali metal chlorate to an electrolytic cell, electrolyzing the electrolyte solution to produce an electrolyzed chlorate solution, transferring the electrolyzed chlorate solution to a chlorate reactor to produce a more concentrated alkali metal chlorate, wherein the electrolytic cell is a non-divided electrolytic cell that includes: at least one anode or at least one cathode that includes an electrode substrate comprising $M_{(n+1)}AX_n$, where M is a metal of group IIIB, IVB, VB, VIB or VIII of the periodic table of elements or a combination thereof, A is an element of group IIIA, IVA, VA or VIA of the periodic table of elements or a combination thereof, X is carbon, nitrogen or a combination thereof, where n is 1, 2, or 3; and an outlet for transferring electrolyzed solution to the chlorate reactor.

6 Claims, 3 Drawing Sheets

(56) References Cited

U.S. PATENT DOCUMENTS

| | | | |
|---|---|---|---|
| 3,883,406 A * | 5/1975 | O'Brien et al. | 205/503 |
| 4,111,765 A * | 9/1978 | De Nora et al. | 205/334 |
| 4,237,204 A | 12/1980 | Thompson et al. | |
| 5,407,547 A | 4/1995 | Landford et al. | |
| 5,419,818 A | 5/1995 | Wanngard | |
| 5,423,959 A | 6/1995 | Sundblad et al. | |
| 5,662,834 A | 9/1997 | Schulz et al. | |
| 5,872,074 A | 2/1999 | Schulz et al. | |
| 6,312,570 B1 | 11/2001 | Mroz, Jr. | |
| 7,001,494 B2 * | 2/2006 | Jovic et al. | 204/252 |
| 2003/0116431 A1 * | 6/2003 | Johansson et al. | 204/290.01 |
| 2005/0011755 A1 | 1/2005 | Jovic et al. | |
| 2006/0239882 A1 | 10/2006 | Seo et al. | |

FOREIGN PATENT DOCUMENTS

| | | |
|---|---|---|
| EP | 0 188 102 A2 | 7/1986 |
| EP | 0 254 982 A2 | 2/1988 |
| EP | 0 347 016 A2 | 12/1989 |
| EP | 0 498 484 A1 | 8/1992 |
| EP | 1 242 654 B1 | 9/2002 |
| JP | 61-41785 A | 2/1986 |
| JP | 61-163281 A | 7/1986 |
| JP | 63-42388 A | 2/1988 |
| JP | 7-34279 A | 2/1995 |
| JP | 2003-513170 A | 4/2003 |
| JP | 2005-536639 A | 12/2005 |
| WO | WO 97/04146 A1 | 2/1997 |
| WO | WO 01/31085 A2 | 5/2001 |
| WO | WO 2004/018733 A2 | 3/2004 |
| WO | WO 2006/039804 A1 | 4/2006 |
| WO | WO 2006/072169 A1 | 7/2006 |

OTHER PUBLICATIONS

International Search Report for International Application No. PCT/EP2008/065515 dated Jun. 8, 2009.

Barsoum et al., "The MaxPhases: Unique Carbide and Nitride Materials," American Scientist, vol. 89 (2001), pp. 334-343.

JP Office Action for Japanese Patent Applicaition No. 2010-533587, mailing date Feb. 26, 2013.

JP English language translation of Office Action for Japanese Patent Applicaition No. 2010-533587, mailing date Feb. 26, 2013.

Patent Abstracts of Japan for JP 7-34279 A (publication date Feb. 3, 1995).

Patent Abstracts of Japan for JP 61-41785 A (publication date Feb. 28, 1986).

* cited by examiner

ELECTRODE

This application is a national stage filing under 35 U.S.C. §371 of PCT/EP2008/065515, filed Nov. 14, 2008, which claims priority to European Patent Application No. 07120923.3, filed Nov. 16, 2007, and U.S. Provisional Patent Application No. 60/988,527, filed on Nov. 16, 2007, the contents of which are incorporated herein by reference in their entirety.

The present invention relates to an electrode, a process of preparing such an electrode, and the use thereof. The invention also involves a process for the production of alkali metal chlorate and an electrolytic cell for such production.

BACKGROUND OF THE INVENTION

Electrodes comprising an electrode substrate bearing a layer or coating of one or several metal oxides for use in electrolytic processes are well known. Common substrates include inter alia titanium, tantalum, nickel, and steel. Today, titanium is often used as electrodes but when titanium is negatively polarized, titanium hydride is formed which eventually seriously harms the stability of the electrode. Steel may corrode during or after stops in an electrolytic cell. Steel cathodes may also conduct atomic hydrogen whereby connection between steel cathodes and titanium based anodes in bipolar cells may need a back-plate to prevent formation of titanium hydride. U.S. Pat. No. 7,001,494 discloses further electrode material for use in a chloralkali cell.

The electrolytic production of alkali metal chlorate, and especially sodium chlorate, is well known. Alkali metal chlorate is an important chemical, particularly in the pulp and paper industry as a raw material for the production of chlorine dioxide that is widely used for bleaching. Conventionally, it is produced by electrolysis of alkali metal chlorides in non-divided electrolytic cells. The overall chemical reaction taking place in such cells is $$MCl + 3H_2O \rightarrow MClO_3 + 3H_2$$

where M is an alkali metal. Examples of chlorate processes are described in inter alia U.S. Pat. No. 5,419,818 and EP 1 242 654.

One object of the present invention involves provision of an electrode which has improved performance in an electrolytic cell. One further object is to provide an electrode that is resistant to hydrogen evolving conditions and reducing conditions in alkaline environment and at least shorter exposures in oxidative environment. A further object of the present invention is to provide an electrolytic cell and a process for the production of alkali metal chlorate. It is particularly desired to provide such a cell in which the formation of oxygen and thereby danger of explosions is decreased while the operating conditions are facilitated. Yet another object of the present invention is to provide a cell in which a bipolar electrode or hybrids of bipolar and monopolar electrodes are mounted.

A further object of the present invention is to provide a cell in which the polarity of the electrodes can be reversed such that the electrodes successively can work as anode and cathode within a given period of time.

A further object of the invention is to provide an electrode improving the cathodic current efficiency when in operation in an electrolytic cell, particularly while reducing the cell voltage. A further object of the invention is to provide an electrode with reduced thickness resulting in material savings and optimization enabling an increased number of electrodes arranged in the same cell space whereby production may be increased without up-scaling an existing plant. A further object of the invention is to provide electrodes which may lower the metal loading of precious metals on an electrode substrate while substantially maintaining the performance of commercial electrodes. A further object of the invention is to provide an electrode that does not corrode whereby sludge which could be deposited on the anodes is not formed.

THE INVENTION

The present invention relates to an electrode comprising
a) an electrode substrate comprising $M_{(n+1)}AX_n$, where M is a metal of group IIIB, IVB, VB, VIB or VIII of the periodic table of elements or a combination thereof, A is an element of group IIIA, IVA, VA or VIA of the periodic table of elements or a combination thereof, X is carbon, nitrogen or a combination thereof, where n is 1, 2, or 3; and
b) an electrocatalytic coating deposited on said electrode substrate selected from at least one of b.1) a metal oxide and/or metal sulfide comprising $B_yC_{(1-y)}O_{z1}S_{z2}$, wherein B is at least one of ruthenium, platinum, rhodium, palladium, iridium, and cobalt, C is at least one valve metal; y is 0.4-0.9; 0<=z1, z2<=2 and z1+z2=2 b.2) a metal oxide comprising $B_fC_gD_hE_i$, wherein B is at least one of ruthenium, platinum, rhodium, palladium, and cobalt, C is at least one valve metal, D is iridium, E is Mo and/or W, wherein f is 0-0.25 or 0.35-1, g is 0-1, h is 0-1, i is 0-1, wherein f+g+h+i=1 b.3) at least one noble metal;

b.4) any alloy or mixture comprising iron-molybdenum, iron-tungsten, iron-nickel, ruthenium-molybdenum, ruthenium-tungsten, or mixtures thereof;

b.5) at least one nanocrystalline material.

According to one embodiment, M is scandium, titanium, vanadium, chromium, zirconium, niobium, molybdenum, hafnium, tantalum or combinations thereof, for example titanium or tantalum.

According to one embodiment, A is aluminum, gallium, indium, thallium, silicon, germanium, tin, lead, sulphur, or combinations thereof, for example silicon.

According to one embodiment, the electrode substrate is selected from any of $Ti_2AlC$, $Nb_2AlC$, $Ti_2GeC$, $Zr_2SnC$, $Hf_2SnC$, $Ti_2SnC$, $Nb_2SnC$, $Zr_2PbC$, $Ti_2AlN$, $(Nb,Ti)_2AlC$, $Cr_2AlC$, $Ta_2AlC$, $V_2AlC$, $V_2PC$, $Nb_2PC$, $Nb_2PC$, $Ti_2PbC$, $Hf_2PbC$, $Ti_2AlN_{0.5}C_{0.5}$, $Zr_2SC$, $Ti_2SC$, $Nb_2SC$, $Hf_2Sc$, $Ti_2GaC$, $V_2GaCCr_2GaC$, $Nb_2GaC$, $Mo_2GaC$, $Ta_2GaC$, $Ti_2GaN$, $Cr_2GaN$, $V_2GaN$, $V_2GeC$, $V_2AsC$, $Nb_2AsC$, $Ti_2CdC$, $Sc_2InC$, $Ti_2InC$, $Zr_2InC$, $Nb_2InC$, $Hf_2InC$, $Ti_2InN$, $Zr_2InN$, $Hf_2InN$, $Hf_2SnN$, $Ti_2TlC$, $Zr_2TlC$, $Hf_2TlC$, $Zr_2TlN$, $Ti_3AlC_2$, $Ti_3GeC_2$, $Ti_3SiC_2$, $Ti_4AlN_3$ or combinations thereof. According to one embodiment, the electrode substrate is any one of $Ti_3SiC_2$, $Ti_2AlC$, $Ti_2AlN$, $Cr_2AlC$, $Ti_3AlC_2$, or combinations thereof. Methods of preparing materials as listed and which may be used as electrode substrate in the present invention are known from *The Max-Phases: Unique New Carbide and Nitride Materials*, American Scientist, Volume 89, p. 334-343, 2001.

According to one embodiment, the configuration of the electrode substrate may, for example, take the form of a flat sheet or plate, a curved surface, a convoluted surface, a punched plate, a woven wire screen, an expanded mesh sheet, a rod, or a tube. However, according to one embodiment, the electrode substrate has a planar shape, e.g. sheet, mesh or plate.

According to one embodiment, the valve metal of b.1) and b.2) may be selected from titanium, tantalum, niobium, zirconium, hafnium, vanadium, molybdenum, tungsten, or combinations thereof, e.g. titanium. However, also other valve metals may be used.

Valve metals are known as film-forming metals having the property, when connected as an electrode in the electrolyte in which the coated electrode is expected to operate, of rapidly forming a passivating oxide film when operating under local anodic condition which protects the underlying metal from corrosion by the electrolyte.

The molar ratio of the electrocatalytic coatings may vary according to the ranges as defined herein. According to one embodiment, y is from 0.5-0.9, such as 0.6-0.9 or 0.7-0.9.

According to one embodiment, f is from 0-0.15 or 0.45-1, for example from 0-0.1 or 0.55-1. According to one embodiment, g is from 0-0.8 such as 0-0.5. According to one embodiment, h is from 0.1-1 or 0-0.65 such as 0.1-0.65. According to one embodiment, i is 0-0.5, or, 0-0.3, such as from 0-0.2.

According to one embodiment, the noble metal is platinum, ruthenium, iridium, rhenium, palladium, gold, silver, rhodium, or combinations thereof. According to one embodiment, the noble metal is platinum, ruthenium, iridium, rhenium, palladium, or combinations thereof.

According to one embodiment, the nanocrystalline material has a specific surface area equal to or higher than $2 \text{ m}^2/\text{g}$. According to one embodiment, the nanocrystalline material has a grain size lower than 100 nm. According to one embodiment, the nanocrystalline material is in the form of a composite or alloy made of K-L-N: wherein K is Pt, Ru or a Pt or Ru compound; L is at least one element selected from the group consisting of Ru, Ge, Si, W, Sn, Ga, As, Sb, Mo, Ti, Ta, Cr, Mn, Fe, Co, Ni, Cu, Rh, V, Pd, Ag, In, Os, Ir, Au, Pb, C, Cd, N, P, Bi, Nb and Zr; and N is at least one element selected from the group consisting of Al, Mg, Zn, Li, Na, K, Ca, Ti, Zr, Mo and U; or N is at least one element selected from the group consisting of H, C, N, O, F, Cl, P and S; or N is a combination of a plurality of elements N as defined hereinabove.

According to one embodiment, the nanocrystalline material is in the form of a composite or alloy made of K'-L'-N', wherein: K' is Mg, Be or a Mg or Be compound; L' is at least one element selected from the group consisting of Li, Ca, Ti, V, Cr, Mn, Fe, Co, Ni, Cu, Zn, Y, Zr, Nb, Mo, In, Sn, O, Si, B and F; and N' is at least one element selected from the group consisting of Al, Mg, Zn, Li, Na, K, Ca, Ti, Zr and Mo; or N' is at least one element selected from the group consisting of H, C, N, O, F, Cl, P, and S; or N' is an organometallic compound in which the metallic element is one of the metals listed in the definition of L' or a metal selected from the group consisting of Ru, Rh, Pd, Ir, and Pt; or N' is a combination of a plurality of element N' as defined hereinabove. The nanocrystalline material may have further characteristics as set out in U.S. Pat. No. 5,872,074, WO 2006/072169, CA 2492128, U.S. Pat. No. 5,662,834, and WO 97/04146. Methods of coating nanocrystalline material on an electrode substrate are also known from said documents.

According to one embodiment, the nanocrystalline material is selected from $MoS_2$, $WS_2$, $RhS_2$, $PdS_2$, $RuS_2$, $PtS_2$ and combinations thereof, e.g. $MoS_2$, $WS_2$, and combinations thereof. The nanocrystalline material may have further characteristics as set out in U.S. Pat. No. 4,237,204.

According to one embodiment, the nanocrystalline material is selected from $M_xRu_{1-x}S_2$, $M_xMo_{1-x}S_2$, $M_xW_{1-x}S_2$, $M_xPd_{1-x}S_2$, $M_xRh_{1-x}S_2$, $M_xPt_{1-x}S_2$ and combinations thereof, where M is selected from Ni, Co, Fe, Al, and x is 0-0.7.

According to one embodiment, the electrode is a cathode. According to one embodiment, the electrode is a bipolar electrode.

According to one embodiment, the electrode is attached to an insulating or non-insulating material acting as support.

According to one embodiment, the density of the electrode substrate ranges from about 3 to about 6, for example from about 4 to about 4.7, or from about 4.2 to about 4.5 $\text{g/cm}^3$.

According to one embodiment, the surface roughness of the electrode substrate measured as ($R_a$, $R_z$) according to SS-EN ISO 4287:1998 ranges from (0.05, 1) to (20, 40), e.g. (1, 3) to (5, 20) in µm.

According to one embodiment, the thickness of the electrode is from about 0.05 to about 5, such as from about 0.5 to about 2.5, or from about 1 to about 2 mm.

According to one embodiment, at least about 10, e.g. at least about 30 or at least about 50, such as at least about 70 or at least about 95% of the geometrical surface area of the electrode substrate is coated with an electrocatalytic coating as disclosed herein.

The invention also relates to a process of producing an electrode, wherein an electrocatalytic coating as defined in any one of b.1) to b5) is formed on the electrode substrate as defined in section a) herein above.

According to one embodiment, the electrode substrate can be roughened by means of machining, sand blasting, grit blasting, chemical etching and the like or combinations like blasting with etchable particles followed by etching. The use of chemical etchants is well known and such etchants include most strong inorganic acids, such as hydrochloric acid, sulphuric acid, nitric acid and phosphoric acid, but also organic acids such as oxalic acid. According to one embodiment, a roughened, blasted and pickled electrode substrate is coated with an electrocatalytic coating, for example by means of dipping, painting, rolling or spraying.

According to one embodiment, to prepare a substrate for etching, it can be most useful to condition the metal, e.g. by annealing, to diffuse impurities to the grain boundaries.

According to one embodiment, the precursor for the coating in the form of a dissolved salt or acid is dissolved in an acidic aqueous or organic solution or mixture thereof. According to one embodiment, an organic dispersion comprises alcohols such as 1-propanol, 2-propanol, butanol, 1-butanol, 1-pentanol, 2-pentanol, 3-methyl-2-butanol, or mixtures thereof. According to one embodiment, the precursor comprises at least one organic salt and/or acid dissolved in an organic solvent, e.g. titanium alcoxide, tetrabutyl titanate, and/or tetrapentyl titanate. According to one embodiment, the precursor comprises at least one inorganic salt or acid dissolved in a substantially aqueous dispersion. According to one embodiment, the precursors of B and C, for example $TiCl_4$ and $RuCl_3$, are dissolved in an organic solvent, such as an alcohol.

According to one embodiment, the organic and/or aqueous precursor solutions have an apparent pH in the range from about 0 to about 5, for example from about 1 to about 4. According to one embodiment, precursors, e.g. salts or acids of the dissolved valve metals include chlorides, nitrates, iodides, bromides, sulfates, borates, carbonates, acetates, and citrates, e.g. $TiCl_3$ or $TiCl_4$ in acid solutions.

According to one embodiment, the precursor solution is deposited on the substrate by applying the solution on the electrode substrate, e.g. until the total loading ranges from about 0.1 to about 10, e.g. from about 1 to about 6, or from about 1.5 to about 3 g of metal/$m^2$, e.g. of a noble metal.

According to one embodiment, in order to obtain a thicker oxide coating, the deposition procedure can be repeated, for example at least 2 or at least 4, or at least 8 times. According to one embodiment, the thickness of the electrocatalytic coating deposited on the electrode substrate, for example a metal oxide coating, is in the range from about 0.1 to about 20, for example from about 0.1 to about 4 μm.

According to one embodiment, the precursor solution is soaked into the pores of the electrode substrate to coat the exposed surface. The penetration depth of the coating solution may be for example 0.1 to about 500 μm.

According to one embodiment, a first coating layer has high valve metal content, e.g. titanium content, e.g. 80 wt % or more based on the total amount of metal of said layer, which adhere well on the electrode substrate. According to one embodiment, the second or subsequent layers have a higher content of component B than the first coating layer, e.g. from about 30 or from about 50 wt % based on the total metal content deposited on the electrode substrate. A gradient of increasing/decreasing contents of metal oxides of components B and C respectively may thus be formed in the electrocatalytic coating. Good adhesiveness of the coating may be provided while using a smaller amount of active component B in the inner layers closer to the electrode substrate and greater amounts in the top layer(s). In the same way, a higher amount of component C may be used in the layer(s) facing the electrode substrate whereas outer layers or top layer(s) may contain a smaller amount of component C.

According to one embodiment, an aqueous or organic solution comprising a precursor of a metal oxide is contacted with the electrode substrate and subsequently adhered thereto by thermal decomposition of the precursor.

According to one embodiment, the precursor is thermally decomposed, e.g. at a temperature from about 200 to about 700° C., for example from about 350 to about 550° C. whereby the forming metal oxide is adhered to the substrate.

According to one embodiment, an electrodepositing solution comprises a molybdenum component (molybdenum in a form capable of being electroplated onto a cathode, e.g. $Na_2MoO_4$) and/or an iron component (iron in a form capable of being electroplated onto a cathode, e.g. $FeCl_3$ or $FeSO_4$) which may be deposited in-situ. The electrodepositing solution may further comprise an iron chelating agent e.g. $Na_4P_2O_7$. The electrodepositing solution may further comprise a buffering agent, such as bicarbonate, e.g. $NaHCO_3$. According to one embodiment, the iron-molybdenum coatings include those having a 5-95% by weight molybdenum. In some embodiments, the iron-molybdenum coating contains from 5-50% by weight molybdenum. In other embodiments, the iron-molybdenum coating contains 10-50% by weight molybdenum. In another embodiment, the iron-molybdenum coating contains 10-40% by weight molybdenum. In another embodiment, the iron-molybdenum coating contains 25-35% by weight molybdenum. In some embodiments, the iron-molybdenum coating comprises 10-20% by weight molybdenum. The concentrations of the electrodepositing solutions may also be as set out in WO2006/039804 A1.

According to one embodiment, an electrocatalytic coating, for example an electrocatalytic oxide coating, for example comprising a molybdenum component, is formed on the electrode substrate by means of electro-deposition in-situ, i.e. inside the cell.

The invention also relates to an electrode obtainable by the process as defined herein. The invention also relates to the use of an electrode as defined herein in an electrolytic cell, e.g. for electrolytic production of monochloroacetic acid, e.g. by reduction of dichloroacetic acid or chlorination of acetic acid. However, the electrode may also be used for any alfa-chlorination of carboxylic acids. The invention also relates to an electrode as defined herein for use in an electro-flotation process. The electrode can also be used in several other applications including production of alkali metal chlorate, HVDC (High-Voltage Direct Current) applications, particularly applications in which the polarity is reversed after at least one hour or at least one day, for example at least one week or at least one month. According to one embodiment, the polarity is reversed after 6 months or after 12 months. The electrode may also be used in disinfecting applications, for example small pools, where reversing of the polarity in order to prevent build-up of impurities on the electrodes can be used. Another application of the electrode includes use in electro-dialyzing (ED) cells, where the present electrode can act both as a cathode and anode.

According to one embodiment, the electrode is employed for electrodialytic water splitting, e.g. for efficient recovery of sulphates. In this process, an aqueous solution containing sulphate of various origin is brought to an electro-dialyzing cell equipped with at least one separator. By applying a direct electric current, the sulphate and water are split into ions, which react to sulphuric acid in the anolyte and to a hydroxide in the catholyte. In a similar way, the electrode may also be used in electro-dialyzing cells for splitting of sodium chlorate, as well as splitting of salt to acid and caustic. Such processes are further disclosed in e.g. U.S. Pat. No. 5,423,959 and U.S. Pat. No. 5,407,547.

The invention further relates to an electrolytic cell for the production of alkali metal chlorate comprising at least one anode and at least one cathode, wherein at least one of said anode and cathode comprises an electrode substrate comprising $M_{(n+1)}AX_n$, where M is a metal of group IIIB, IVB, VB, VIB or VIII of the periodic table of elements or a combination thereof, A is an element of group IIIA, IVA, VA or VIA of the periodic table of elements or a combination thereof, X is carbon, nitrogen or a combination thereof, where n is 1, 2, or 3.

According to one embodiment, the cell has a robust construction withstanding electrolyte flows having a linear velocity in the cell gap ranging from about 0.1 to about 4, such as from about 0.2 to about 1.3 m/s.

According to one embodiment, also inlets and outlets to the cell are so designed to cope with robust process conditions as in a commercial chlorate cell.

According to one embodiment, the cell is a non-divided, e.g. a monopolar cell. This enables a variety of cell configurations. At least one electrode pair of anode and cathode may form a unit containing an electrolyte between the anode and cathode which unit may have the shape of plates or tubes. A plurality of electrode pairs may also be immersed in a cell box. According to one embodiment, the cell is a bipolar cell. According to one embodiment, at least one cathode and anode comprise an electrode substrate as disclosed herein. Said cathode and anode may further comprise an electrocatalytic coating as defined in b.1)-b.5) herein above.

According to one embodiment, the cell is a hybrid cell, i.e. a combined monopolar and bipolar cell. This type of cells enables upgrading of monopolar technology by combining monopolar and bipolar sections in a cell-box. Such combination may be set up by arranging e.g. two or three electrodes as disclosed herein as a bipolar section among a plurality of monopolar electrodes. The monopolar electrodes of the hybrid cell may be of any type including e.g. conventional electrodes known per se.

According to one embodiment, separate monopolar anodes and cathodes are mounted in an electrolytic cell at the ends, whereas bipolar electrodes are mounted in between thereby forming a hybrid electrolytic cell.

According to one embodiment, at least one electrode as described herein is arranged in the cell. According to one embodiment, the polarity of at least one electrode pair is successively reversed in the cell.

The invention further relates to a process of producing alkali metal chlorate comprising introducing an electrolyte solution containing alkali metal halide and alkali metal chlorate to an electrolytic cell as defined herein, electrolyzing the electrolyte solution to produce an electrolyzed chlorate solution, transferring the electrolysed chlorate solution to a chlorate reactor to react the electrolysed chlorate solution further to produce a more concentrated alkali metal chlorate electrolyte. As the electrolysis occurs, chlorine is formed at the anode which immediately forms hypochlorite while hydrogen gas is formed at the cathode.

According to one embodiment, the current density of the process ranges from about 0.6 to about 4.5, for example from about 1 to about 3.5, or from about 1.3 to about 2.9 kA/m$^2$.

According to one embodiment, the chlorate formed is separated by crystallization while the mother liquor is recycled for preparing chloride electrolyte for further electrolysis to form hypochlorite.

According to one embodiment, pH is adjusted in several positions within the range 5.5-12 to optimize the process conditions for the respective unit operation. Thus, a weakly acid or neutral pH is used in the electrolyzer and in the reaction vessels to promote the reaction from hypochlorite to chlorate, while the pH in the crystallizer is alkaline to prevent gaseous hypochlorite and chlorine from being formed and released and to reduce the risk of corrosion. According to one embodiment, the pH of the solution fed into the cell ranges from about 5 to about 7, for example from about 5.5 to about 6.5, such as from about 5.8 to about 6.5.

According to one embodiment, the electrolyte solution contains alkali metal halide, e.g. sodium chloride in a concentration from about 80 to about 180, for example from about 100 to about 140 or from about 106 to about 125 g/l. According to one embodiment, the electrolyte solution contains alkali metal chlorate in a concentration from about 0 to about 700, e.g. from about 450 to about 700, e.g. from about 500 to about 650 or from about 550 to about 610 g sodium chlorate/l. According to one embodiment, the introduced alkali metal halide solution contains chromate calculated as $Na_2Cr_2O_7$ in a concentration from about 0 to about 10, for example from about 1 to about 7 or from about 2 to about 6 g/l.

According to one embodiment, the process is used for producing sodium chlorate or potassium chlorate, but other alkali metal chlorates can also be produced. The production of potassium chlorate can be effected by adding a purified potassium chloride solution to an alkalized partial flow of electrolytically produced sodium chlorate, succeeded by precipitation of crystals by cooling and/or evaporation. The chlorate is suitably produced by a continuous process, but a batchwise process can also be used.

According to one embodiment, alkali metal chloride in the form of a technical-grade salt and raw water are supplied to prepare salt slurry. Such a preparation is disclosed e.g. in EP-A-0 498 484. According to one embodiment, the flow to the chlorate cells normally is from 75 to 200 m$^3$ of electrolyte per metric ton of alkali metal chlorate produced. According to one embodiment, each chlorate cell operates at a temperature ranging from about 50 to about 100, for example from about 60 to about 80° C. According to one embodiment, a part of the chlorate electrolyte is recycled from the reaction vessels to the salt slurry, and some for alkalization and electrolyte filtration and final pH adjustment before the chlorate crystallizer. The thus-alkalized electrolyte is evaporated in the crystallizer, sodium chlorate crystallized and withdrawn over a filter or via a centrifuge while water driven off is condensed.

According to one embodiment, the mother liquor, which is saturated with respect to chlorate and contains high contents of sodium chloride is recycled directly to the preparation slurry and via cell gas scrubbers and reactor gas scrubbers. According to one embodiment, the pressure in the cell is about 20 to 30 mbar above atmospheric pressure.

According to one embodiment, the (electrical) conductivity in the cell electrolyte ranges from about 200 to about 700, for example from about 300 to about 600 mS/cm.

According to one embodiment, the temperature in the cell ranges from about 50 to about 110, for example from about 70 to about 100, or from about 75 to about 95° C.

According to one embodiment, the anode and/or cathode is an electrode as defined herein above, which further may comprise an electrocatalytic coating b.1)-b.5).

BRIEF DESCRIPTION OF THE DRAWINGS

FIG. 1 shows results of the present invention. It can be clearly seen that at positive potentials at which oxygen and chlorine are produced, the activity of Maxthal® 312 (2) is low. A thin layer of $RuO_2/TiO_2$ coated on Maxthal® 312 (3), however, resulted in an activity almost as high as PSC120 (1). FIG. 1 also shows that it is possible to reverse the potential of the activated Maxthal® 312 electrode and obtain good cathodic performance for hydrogen evolution.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. The following examples will further illustrate how the described invention may be performed without limiting the scope of it.

All parts and percentages refer to part and percent by weight, if not otherwise stated.

EXAMPLE 1

A small chlorate producing pilot comprising an electrolyzing cell and a reaction vessel (also acting as a gas separator) was used. The electrolyte was circulated by means of a pump. On top of the reactor vessel, gas was withdrawn where a small amount of chlorine species was absorbed in 5 Molar sodium hydroxide and water was completely eliminated by adsorption in desiccant. The oxygen content in the remaining gas was then measured continuously in % by volume. The flow (liter/s) of the same gas was also measured in order to calculate the cathodic current efficiency (CCE) on the cathode. The hydrogen flow rate was determined by subtracting the oxygen part from the total gas flow rate. The CCE was then calculated from the hydrogen flow rate using the following expression CCE=(Normal liter $H_2$ per second/22.4)·(2 F/I), where F is Faraday's constant, and I is the current through the cell in ampere.

The starting electrolyte used was a water solution containing 120 g/L NaCl and 580 g/L $NaClO_3$. The anode in the electrolyzing cell was a PSC120 (DSA®, $TiO_2/RuO_2$) available from Permascand. Three different types of cathodes were used: a steel plate, a titanium plate (Grade 1) and MAXTHAL® 312 ($Ti_3SiC_2$) (4.1 g/cm$^3$) available from Kanthal with a machined surface. The distance between the anode and the cathode was about 4 mm. The exposed geometrical surface area for electrolysis, for the anode and cathode respectively, was 30 cm². A current density of 3 kA/m² was used in each experiment. The results are presented in table 1 below.

TABLE 1

| Oxygen (%) | CCE (%) | Cell voltage (V) | Comment |
|---|---|---|---|
| 3.7 | 92 | 3.30 | Titanium (Grade 1) |
| 3.7 | 96 | 3.30 | Titanium after stop |
| 4.2 | 86 | 3.01 | Mild steel (after acid wash) |
| N/A* | 0 | 2.61 | Mild steel after stop |
| 3.9 | 100 | 3.24 | MAXTHAL ® 312 (4.1 g/cm³) |

*The reaction vessel was flushed with nitrogen for safety reasons.

Each experiment (cathode) was carried out over a period of about four hours. No corrosion could be seen on the titanium plates for this short period of time. The steel cathode clearly corroded, the color of the electrolyte clearly changed during a stop when the circulation pump was on. No hydrogen gas was formed on the cathode directly after a stop. No effect of corrosion could be seen on the MAXTHAL® 312 material, and no measurable weight change was found.

EXAMPLE 2

The same pilot set-up as in example 1 was used. The starting electrolyte used was a water solution containing 120 g/L NaCl, 580 g/L NaClO₃, and 4.4 g/L Na₂Cr₂O₇.

The anode in the electrolyzing cell was a PSC120 (DSA®, $TiO_2/RuO_2$), available from Permascand. The cathode material was MAXTHAL® 312 (4.1 g/cm³) with a machined surface. The distance between the anode and cathode was about 4 mm. The exposed surface area was 30 cm². A current density of 3 kA/m² was used throughout the experiments. The results are presented in table 2.

TABLE 2

| Oxygen (%) | CCE (%) | Cell voltage (V) | Comment |
|---|---|---|---|
| 2.3 | 99 | 3.37 | Titanium (Grade 1) |
| — | — | — | Titanium after stop |
| 2.2 | 97 | 3.00 | Mild Steel |
| 2.4 | 90 | 3.01 | Steel after stop |
| 2.3 | 100 | 3.28 | Maxthal ® 312 (4.1 g/cm³) |
| 2.3 | 100 | 3.23 | Maxthal ® 312 after stop |

EXAMPLE 3

The same pilot set-up and experimental starting parameters were used as in Example 2. The results are presented in table 3.

TABLE 3

| Oxygen (%) | CCE (%) | Cell voltage (V) | (Ra, Rz)/μm | Comment |
|---|---|---|---|---|
| 1.8 | 100 | 3.35 | (3.82, 18.06) | Machined Maxthal ® 312 |
| 1.8 | 100 | 3.33 | — | After stop |
| 2.1 | 100 | 3.29 | (1.79, 11.49) | Sand blasted Maxthal ® 312 |

TABLE 3-continued

| Oxygen (%) | CCE (%) | Cell voltage (V) | (Ra, Rz)/μm | Comment |
|---|---|---|---|---|
| 2.1 | 100 | 3.28 | — | 312 After stop |
| 1.7 | 100 | 3.36 | (0.39, 3.05) | Polished Maxthal ® 312 |
| 1.7 | 100 | 3.34 | — | After Stop |

The density of the Maxthal ® 312 was 4.1 g/cm³.

These experiments clearly give an indication of how the surface roughness affects the cell voltage and oxygen formation. Surface roughness values $R_a$ and $R_z$ between 1 and 3 μm and 5 to 15 μm respectively resulted in the lowest cell voltage according to these experiments.

EXAMPLE 4

In order to verify that molybdenum oxide and tungsten oxide can be used in combination with ruthenium oxide in a cathodic coating compared to a standard $Ti_{0.7}Ru_{0.3}O_2$ coating, the following experiment steps were performed:
1. A citric acid water (pH2) solution was used as solvent.
2. 0.5% by weight of ruthenium chloride salt was dissolved in the solvent.
3. An equivalent molar amount (based on the amount of ruthenium chloride dissolved) of molybdenum chloride or tungsten chloride was dissolved in a solution.
4. The two solutions were spread on two titanium plates using a small brush.
5. The plates were placed in air at 70° C. for 10 minutes.
6. The plates were placed in air at 470° C. for 10 minutes.
7. Another layer of molybdenum chloride or tungsten chloride solution was spread out on each electrode.
8. The plates were placed in air at 70° C. for 10 minutes.
9. The plates were placed in air at 470° C. for 60 minutes.

The plates were then used as cathodes in two experiments and compared to the results in which a PSC120 was used as a cathode. The same pilot set-up and experimental parameters as in Example 2 were used.

TABLE 4

| Oxygen (%) | CCE (%) | Cell voltage (V) | Comment |
|---|---|---|---|
| 2.3 | 95 | 2.87 | PSC120 |
| 2.3 | 96 | 2.85 | After stop |
| 2.0 | 100 | 3.14 | Mo/Ru-oxide on Ti (Grade 1) |
| 2.1 | 99 | 3.18 | After stop |
| 2.2 | 99 | 3.22 | W/Ru-oxide on Ti (Grade 1) |
| 2.2 | 99 | 3.27 | After stop |

In this experiment, the current efficiency of the titanium cathodes coated with molybdenum oxide and tungsten oxide (close to 100%) were superior to the current efficiency of the PSC 120. For the molybdenum oxide-coated cathode, a decrease in oxygen formation was also observed.

EXAMPLE 5

A rotating disk set-up was used to perform tests of small electrodes. A rotating disk was used as working electrode (cathode) and a large platinum mesh was used as counter electrode (anode). The working electrode was rotated at a speed of 1000 rpm.

The starting electrolyte used was a water solution containing 110 g/L NaCl, 550 g/L NaClO$_3$, and 5 g/L Na$_2$Cr$_2$O$_7$. The current density at the working electrode was 1 kA/m$^2$. To demonstrate that the Maxthal® material can be coated with a conductive oxide such as Ti$_{0.7}$Ru$_{0.3}$O$_2$ the following experiment steps were performed:

A small disc of Maxthal® 312 (4.41 g/cm$^3$) with an untreated surface (R$_a$=1.7 and R$_z$=10) was used as substrate for the coating.
1. The solution used in the coating procedure was TiCl$_4$ and RuCl$_3$.3H$_2$O (molar ratio Ru:Ti=3:7) dissolved in n-butanol.
2. The small disc was degreased and washed with acetone.
3. The brush was dipped into the solution described in (1) and one side of the small disk was dabbed with the brush to cover it with solution.
4. The disk was placed in air at 70° C. for 10 minutes.
5. The disk was placed in air at 470° C. for 60 minutes.
6. The disk was placed in a holder and used as a cathode (negatively polarized).

TABLE 5

| Cell voltage/V | Temperature/° C. | Time/min | Comment |
| --- | --- | --- | --- |
| 3.64 | 69.5 | 6 | Ti (Grade 1) |
| 3.54 | 69.6 | 6 | Maxthal ® |
| 3.38 | 69.2 | 5 | Maxthal ® + Ti$_{0.7}$Ru$_{0.3}$O$_2$ |

An activation of about 160 mV could be noted when Ti$_{0.7}$Ru$_{0.3}$O$_2$ was applied on the Maxthal® 312 substrate compared to Maxthal® 312 without coating.

When the electrode was visually inspected after polarization, the coating appeared intact on the Maxthal® 312 and no traces of coating material were observed in the electrolyte.

EXAMPLE 6

In order to verify whether activated (coated) Maxthal® 312, as produced in Example 5, also could be used as anode and if the polarity easily could be reversed, a cyclic voltammetry experiment, with a scan rate of 100 mV/s, was performed. The same set-up as in Example 5 was used but in this example, a reference electrode was used having a rotating speed of 2000 rpm.

Three electrodes were compared in the experiment:
1. PSC120
2. Maxthal® 312
3. Ti$_{0.7}$Ru$_{0.3}$O$_2$ activated Maxthal® 312

Electrode number 3 was wiped off with a white cloth after the experiment. No trace of coating could be observed on the cloth. This indicates high stability of the coating regardless of its positive or negative polarization.

EXAMPLE 7

A small chlorate producing pilot comprising an electrolyzing cell and a reaction vessel (also acting as a gas separator) was used. The electrolyte was circulated by means of a pump. On top of the reactor vessel, gas was withdrawn where a small amount of chlorine species was absorbed in 5 Molar sodium hydroxide and water was completely eliminated by adsorption in desiccant. The oxygen content in the remaining gas was then measured continuously in % by volume. The flow (liter/s) of the same gas was also measured in order to calculate the cathodic current efficiency (CCE) on the cathode. The hydrogen flow rate was determined by subtracting the oxygen part from the total gas flow rate. The CCE was then calculated from the hydrogen flow rate using the following expression CCE=(Normal liter H$_2$ per second/22.4)·(2 F/I), where F is Faraday's constant, and I is the current through the cell in ampere.

The starting electrolyte used was a water solution containing 120 g/L NaCl and 580 g/L NaClO$_3$ and 4.4 g/L sodium dichromate. The anode in the electrolyzing cell was a PSC120 (DSA®, TiO$_2$/RuO$_2$) available from Permascand.

As cathode base material three MAXTHAL® 312 (Ti$_3$SiC$_2$) (4.1 g/cm$^3$) plates, available from Kanthal were used separately, coated with three different coatings as shown in table 6 below. The distance between the anode and the cathode was about 4 mm. The exposed geometrical surface area for electrolysis, for the anode and cathode respectively, was 30 cm$^2$. A current density of 3 kA/m$^2$ was used in each experiment.

TABLE 6

| Oxygen (%) | CCE (%) | Cell voltage (V) | Coating* |
| --- | --- | --- | --- |
| 2.1 | ~100 | 2.85 | 1$^{st}$, 2$^{nd}$ and 3$^{rd}$ Ru$_{0.83}$Mo$_{0.17}$O$_2$ |
| 2.1 | ~100 | 2.89** | 1$^{st}$, 2$^{nd}$ and 3$^{rd}$ Ru$_{0.83}$Mo$_{0.17}$O$_2$ |
| 2.2 | ~100 | 2.93 | 1$^{st}$ layer Ru$_{0.3}$Ti$_{0.7}$O$_2$; 2$^{nd}$ and 3$^{rd}$ Ru$_{0.83}$Mo$_{0.17}$O$_2$ |
| 2.2 | ~100 | 2.94** | 1$^{st}$ layer Ru$_{0.3}$Ti$_{0.7}$O$_2$; 2$^{nd}$ and 3$^{rd}$ Ru$_{0.83}$Mo$_{0.17}$O$_2$ |
| 2.8 | ~95 | 2.80 | 1$^{st}$, 2$^{nd}$ and 3$^{rd}$ RuO$_2$ |
| 2.8 | — | 2.83** | 1$^{st}$, 2$^{nd}$ and 3$^{rd}$ RuO$_2$ |

*Three layers where applied with the shown rations all using salts dissolved in water
**After stop (the power is shut off for five minutes and then started again)

It is clear that the molybdenum-containing coatings have a beneficial effect on CCE and oxygen levels. It is also clearly shown that pure RuO$_2$ gives the lowest cell potential.

EXAMPLE 8

A 600 mL tempered beaker containing a water solution of 550 g/L NaClO3, 120 g/L NaCl, and 5 g/L sodium dichromate was used in this experiment. The solution in the beaker had a temperature of 70° C. which was used as an electrolyte for two small electrode plates facing each other. The electrodes used were only coated with catalyst on one side. The anode was always Titanium (Grade 1) coated with PSC120 (DSA®, TiO$_2$/RuO$_2$), and the cathodes used were MAXTHAL® 312 (Ti$_3$SiC$_2$) (4.1 g/cm$^3$) coated with different TiO$_2$/RuO$_2$ ratios on top, as shown in table below. The distance between the anode and cathode was about 3.0±0.1 mm.

TABLE 7

| Ru/Ti relation* | Cell gap potential** |
| --- | --- |
| 30/70 | 2.975*** |
| 50/50 | 2.835*** |
| 70/30 | 2.74 |
| 100/0 | 2.73*** |

*This is the molar relation between ruthenium oxide and titanium oxide acting as catalyst on the cathode.
**This is the potential between anode and cathode after one minute of electrolysis.
***Average of two runs.

Figure 1:
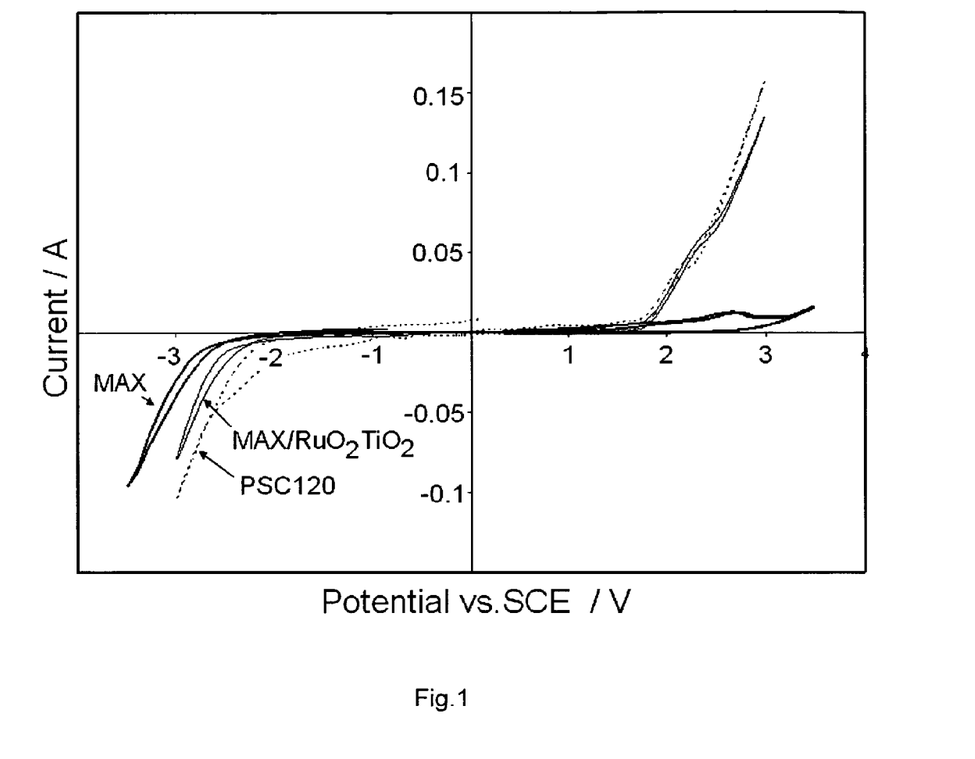
Figure 2:
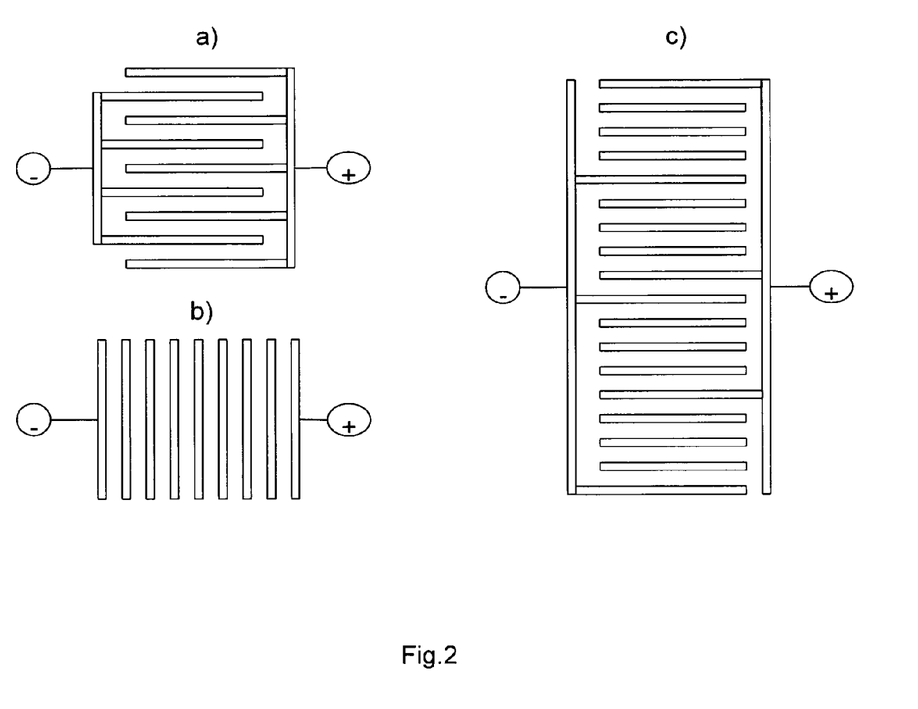
FIG. 2 shows schematic illustrations of a) monopolar, b) bipolar, and c) hybrids of monopolar and bipolar cell designs.
Figure 3:
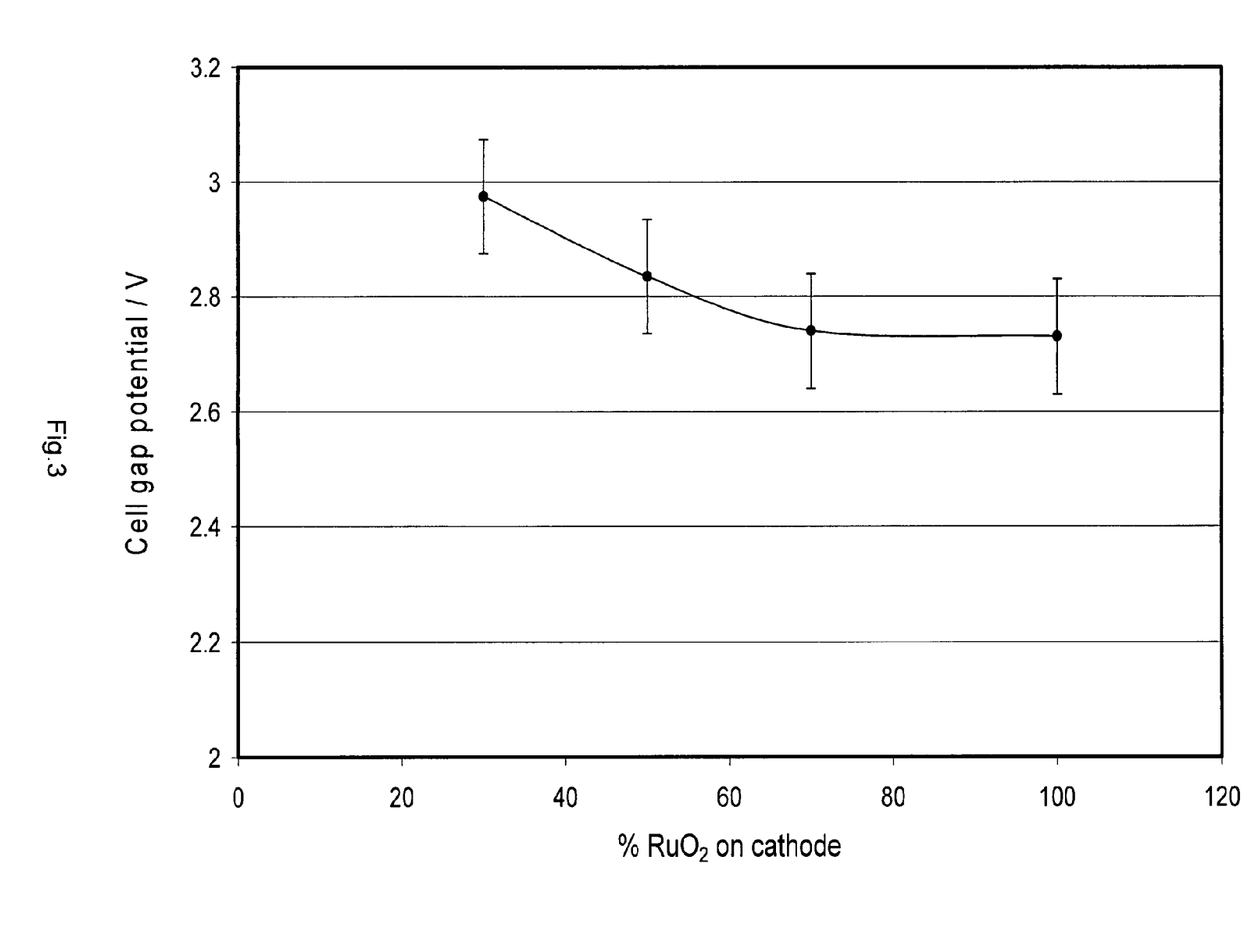
FIG. 3 shows the cell gap potential (potential between anode and cathode) as a function of the amount of Ru present in the molar ratio of Ru/Ti oxide used as catalyst on the cathode.

Table 7 can also be plotted as shown in FIG. 3 which clearly shows the advantage of having more than 30 mol % ruthenium on the cathode.

The invention claimed is:
1. A process of producing alkali metal chlorate comprising introducing an electrolyte solution and containing alkaline metal halide and alkali metal chlorate to an electrolytic cell, electrolyzing the electrolyte solution to produce an electrolyzed chlorate solution, and transferring the electrolyzed chlorate solution to a chlorate reactor to react the electrolyzed chlorate solution further to produce a more concentrated alkali metal chlorate, wherein said electrolytic cell is a non-divided electrolytic cell comprising:

(1) at least one anode and at least one cathode, wherein said at least one cathode comprises an electrode substrate comprising $M_{(n+1)}AX_n$, where M is a metal of group IIIB, IVB, VB, VIB or VIII of the periodic table of elements or a combination thereof, A is an element of group IIIA, IVA, VA or VIA of the periodic table of elements or a combination thereof, X is carbon, nitrogen or a combination thereof, where n is 1, 2, or 3;

(2) an electrocatalytic coating deposited on said electrode substrate, said coating selected from at least one of:

a) a metal oxide and/or metal sulfide comprising $B_yC_{(1-y)}O_{z1}S_{z2}$, wherein B is at least one of ruthenium, platinum, rhodium, palladium, iridium, and cobalt, C is at least one valve metal, y is 0.4-0.9, $0 \leq z1, z2 \leq 2$ and $z1+z2=2$; or b) an oxide of a metal comprising $B_fC_gD_hE_i$, wherein B is at least one of ruthenium, platinum, rhodium, palladium, and cobalt, C is at least one valve metal, D is iridium, E is Mo and/or W, wherein f is 0.35-1, g is 0-1, h is 0-1, i is 0-0.5, wherein f+g+h+i=1; and (3) an outlet for transferring the electrolyzed chlorate solution to the chlorate reactor.

2. The process according to claim 1, wherein the introduced electrolyte solution further contains chromate calculated as $Na_2Cr_2O_7$ in a concentration from about 1 to about 7 g/L.

3. The process according to claim 1, wherein the polarity of at least one electrode pair is successively reversed.

4. The process according to claim 1, wherein y is 0.5-0.9 and f is 0.45-1.

5. The process according to claim 4, wherein y is 0.5-0.9 and f is 0.55-1.

6. The process according to claim 5, wherein y is 0.6-0.9 and f is 0.55-1.

* * * * *